US009251578B2

(12) United States Patent
Hendricks

(10) Patent No.: US 9,251,578 B2
(45) Date of Patent: Feb. 2, 2016

(54) SYSTEM AND METHOD FOR MATCH MOVE QUALITY CONTROL

(71) Applicant: Benjamin Hendricks, Sherman Oaks, CA (US)

(72) Inventor: Benjamin Hendricks, Sherman Oaks, CA (US)

(73) Assignees: SONY CORPORATION, Tokyo (JP); SONY PICTURES TECHNOLOGIES INC., Culver City, CA (US)

( * ) Notice: Subject to any disclaimer, the term of this patent is extended or adjusted under 35 U.S.C. 154(b) by 388 days.

(21) Appl. No.: 13/649,628

(22) Filed: Oct. 11, 2012

(65) Prior Publication Data

US 2014/0002446 A1 Jan. 2, 2014

Related U.S. Application Data

(60) Provisional application No. 61/667,150, filed on Jul. 2, 2012.

(51) Int. Cl.
*G06T 7/00* (2006.01)
*G01B 11/25* (2006.01)
*H04N 13/02* (2006.01)
*H04N 13/00* (2006.01)

(52) U.S. Cl.
CPC ......... *G06T 7/0002* (2013.01); *G01B 11/2545* (2013.01); *G06T 2207/10021* (2013.01); *G06T 2207/30168* (2013.01); *H04N 13/0239* (2013.01); *H04N 2013/0081* (2013.01)

(58) Field of Classification Search
CPC .......... H04N 13/0246; H04N 13/0022; H04N 13/004; H04N 13/0275; H04N 5/272; H04N 13/0055; H04N 2013/0081; H04N 13/0018; H04N 5/262; H04N 13/0409; H04N 13/0415; H04N 13/0475; H04N 5/23212; H04N 7/147; H04N 13/0011; H04N 13/0029; H04N 13/0037; H04N 13/02; H04N 13/0447; H04N 19/117; H04N 19/14; H04N 19/176; H04N 19/46; H04N 19/48; H04N 19/63; H04N 19/82; H04N 19/85; H04N 7/18; H04N 13/0003; G06T 2207/10021; G06T 7/0075; G06T 7/0042; G06T 7/2033; G06T 2207/10012; G06T 2207/10028; G06T 17/00; G06T 19/00; G06T 19/006; G06T 7/0001; G06T 7/0006; G06T 1/0064; G06T 2207/10004; G06T 7/0044; G06K 2009/2045

See application file for complete search history.

(56) References Cited

U.S. PATENT DOCUMENTS

| 2009/0116732 | A1 | 5/2009 | Zhou et al. | |
|---|---|---|---|---|
| 2010/0027888 | A1* | 2/2010 | Katano et al. | 382/173 |
| 2012/0081360 | A1 | 4/2012 | Uehira et al. | |

OTHER PUBLICATIONS

Shading version by Maya 6, 2004, retrieved from https://courses.cs.washington.edu/courses/cse459/06wi/help/mayaguide/Complete/Shading.pdf on Oct. 30, 2014.*

(Continued)

*Primary Examiner* — Haixia Du
(74) *Attorney, Agent, or Firm* — Mark D. Wieczorek; Mayer & Williams PC

(57) ABSTRACT

Systems and methods are provided for managing depths in stereo images. In one implementation, systems and methods are provided for using a procedural shader and automated rendering to match depths of computer-generated images with that of native stereo images, i.e., images recorded using two cameras for stereo imaging. The system and method may employ a checkerboard and a tri-planar shader, and may further employ a texture reference object to make more convenient and intuitive the depth matching.

14 Claims, 11 Drawing Sheets

(56) References Cited

OTHER PUBLICATIONS

Real VIZ MatchMover Full Tutorial, 1999, retrieved from http://accad.osu.edu/~pete/Tutorials/IPF/tutorial-MM.pdf on Oct. 30, 2014.*

Mirpour, "A Comparison of 3D Camera Tracking Software," Thesis, University of Gavle, http://muscleyes.com/docs/Sasha_Mirpour_3D_Camera_Tracking.pdf. Sep. 2008. pp. 1-34.

Dobbert, The Basics of Matchmoving, chapter 1 in Matchmoving: The Invisible Art of Camera Tracking, Wiley, Mar. 2005. pp. 1-22, http://media.wiley.com/product_data/excerpt/39/07821440/0782144039-2.pdf.

Ruhl et al., Integrating Multiple Depth Sensors into the Virtual Video Camera, http://webstaff.itn.liu.se/~perla/Siggraph2011/content/posters/13b-ruhl.pdf. Aug. 7-11, 2011, 1 page.

* cited by examiner

SYSTEM AND METHOD FOR MATCH MOVE QUALITY CONTROL

CROSS-REFERENCE TO RELATED APPLICATIONS

This application claims benefit of priority of U.S. Provisional Patent Application Ser. No. 61/667,150, filed Jul. 2, 2012, entitled "TRI-PLANAR CHECKERBOARD FOR MATCH MOVE QC", owned by the assignee of the present application and herein incorporated by reference in its entirety.

BACKGROUND

Movies presented in 3-D are enjoying tremendous popularity. One way of achieving three-dimensional images is by way of stereography. In stereography two images are captured and presented to a user, one from a left camera and for the left eye of a viewer, and one from a right camera and for a right eye of a viewer. It is one of the oldest ways of producing a 3-D image for a viewer.

Today's cinematography commonly blends live-action footage with computer-generated objects or characters. For example, a live-action actor may have a computer-generated spider moving on their shoulder, and the CG spider must move with both the character and the camera. One way of performing this movement is with match move processes or just "match moving", also known as camera tracking. Markers are placed on significant points of the live-action images, and the movements of these points define how a virtual camera, imaging CG object, should move as well, to match the physical camera.

While match moving is highly accurate in two dimensions, significant errors can exist when extended to multiple distinct viewing angles as exist in a stereographic camera system. Accordingly, there is a need to improve match moving for such systems.

SUMMARY

Matching the depths of computer-generated images and graphics with the depths of objects in native stereo plates can be difficult. After solving for match move and rotomation, the depth of the image may not be at the desired depth when compared to the native stereo image depth. For example, appropriately aligning a CG object with an image using an image from a left camera may result in adequate tracking from the left (two-dimensional) point of view; however, the CG object may be significantly misaligned when viewed from the right camera. For example, the CG object may not be at a correct angle to a surface or may float above a surface. Accordingly, in systems and methods according the principles disclosed here, a computer system checks geometry for depth by projecting a repeating pattern, such as a checkerboard on a CG object, where the CG object may bear some relation to the underlying plate. For example, the CG object may model a surface of a feature or structure in the native stereo plate image, or may otherwise be used as a reference for placement of a CG object. By checking how the repeating pattern on the object moves and comparing to how the native stereo images move as a scene is played, a user can evaluate if a match move system is properly aligned. The checking may be performed by a user using an appropriately-styled user interface, or may be performed automatically by a computing environment.

Systems and methods according to the present principles improve match moving by providing a convenient way to perform quality control on a match move image, e.g., one combining a live action shot and a computer-generated object. In one aspect, the systems and methods manage depth in stereo images. For example, a computer system may use a procedural shader and automated rendering to match depths of computer-generated images with native stereo images, i.e., images recorded using two stereo cameras. The system and method may employ a checkerboard pattern and a tri-planar shader to visualize stereo depths, for both automated depth matching and depth matching employing user input. The system and method may further employ texture reference objects to make even more convenient the quality control process.

In one specific implementation, a checkerboard or similar repeating texture with substantially equally-sized 2D pattern elements is projected onto CG objects in a scene using a tri-planar shader in a 3-D program, e.g., Maya™. Tri-planar projection is UV-independent, meaning that the geometry does not need properly laid out or evenly-spaced UVs for this texture to be clear, such aspect being helpful for complex surfaces. Tri-planar shading employs a facing angle of each face of geometry to determine which world space axis the projection should emanate from, which results in relatively even spacing of the pattern regardless of geometry, orientation, or complexity.

The system and method may also employ a "texture reference object" for one or more pieces of geometry so that the texture as it is applied initially, e.g., on a first frame, is locked to the surface as it animates, rather than the texture swimming through the surface of the geometry if the system and method did not use this referencing. The resulting pattern is composited back onto the plate using any of various blending modes and then evaluated for quality in that state.

In one aspect, the invention is directed towards a method for presenting an image for depth evaluation, including: displaying a set of native stereo images; projecting a repeating pattern on at least one surface of an image using a shader; locking a texture to a surface of at least one object in the image; and compositing an image from the set with the surface with the pattern and presenting the resulting image for evaluation on a display.

Implementations of the invention may include one or more of the following. The repeating pattern may be a checkerboard pattern, and the shader may be a tri-planar shader.

In another aspect, the invention is directed towards a method of performing quality control during a match move process, including: displaying a first series of images pertaining to first and second stereographic views of native stereo plates, the native stereo plates having at least one feature thereon; projecting on a CG object a second series of images pertaining to respective first and second stereographic views, the second series match moved to the first series and including a repeating pattern; and presenting the resulting image for evaluation on a display.

Implementations of the invention may include one or more of the following. The repeating pattern may be projected by a tri-planar shader. The repeating pattern may be projected on a surface of a CG object within the second series of images, and the method may further include locking the repeating pattern onto the CG object by creating a texture reference object for the surface. The method may further include evaluating the depth of the second series relative to a feature on the native stereo plates, and the evaluating may in some cases be performed automatically. The method may further include corresponding a point of the feature with a point on the patterned object, and the evaluating may further include detecting a first distance from a viewing plane of the feature in the native stereo plate, and detecting a second distance from the viewing plane of the corresponding point on the patterned object, and providing an output indicating a difference between the first and second distances. The evaluating may be performed for a plurality of points on the patterned object and corresponding points on the feature, and the providing an output may be performed graphically by providing an output indicating difference values for each point in the plurality of points. The evaluation may also be performed with user input. The method may further include providing a user interface for displaying the first and second series of images and for accepting user input on resolving unsatisfactory match moves. The accepting user input may include accepting user input altering a position or orientation of the patterned object, or may also include accepting user input includes accepting user input altering a camera parameter, such as a degree of rotation or a position. The method may further include calculating an optimized spacing for the repeating pattern based on a size of the CG object or a distance of the CG object from a viewing plane.

In another implementation, the invention is directed towards a non-transitory computer-readable medium, including instructions for causing a computing environment to perform the above method.

In a further implementation, the invention is directed towards a method of assisting quality control during a match move process, including: capturing a first series of images pertaining to first and second stereographic views of native stereo plates, the native stereo plates having at least one feature thereon, the first series of images captured using cameras with ranged imaging, such that a depth value is obtained at least for the feature; overlaying on the first series a second series of images pertaining to respective first and second stereographic views, the second series match moved to the first series and including a CG object, the CG object having a point corresponding to a point on the feature; and where the overlaying is performed by a method including setting a location of the CG object such that the point of the CG object is coincident with the corresponding point on the feature.

In yet another implementation, the invention is directed towards a method of assisting quality control during a match move process, including: capturing a first series of images pertaining to first and second stereographic views of native stereo plates; calculating a disparity map from the first and second stereographic views; from the disparity map and camera data including intraocular distance calculating depths for a plurality of points in the first and second stereographic views; and comparing the calculated depths to rendered depths from a CG match move geometry to compare the location of points in the geometry to corresponding points in the first and second stereographic views.

In a further implementation, the invention is directed towards a quality control system for creating a desired second image based on a first image, including: a native stereo plate image module, for displaying a first series of images pertaining to first and second stereographic views of native stereo plates, the native stereo plates having at least one feature thereon; and a projection module, for projecting on the first series a second series of images pertaining to respective first and second stereographic views, the second series match moved to the first series and including a CG object on which is projected a repeating pattern.

Implementations of the invention may include one or more of the following. The system may further include a quality control determination module, for determining quantitatively how the second series moves along with the first series as the respective series are simultaneously sequentially displayed. The projection module may project the repeating pattern using a tri-planar shader. The repeating pattern may be locked onto a surface of the CG object by creating a texture reference object for the surface.

Advantages of certain implementations of the invention may include one or more of the following. The systems and methods can provide a clear view of depths on match moved and rotomated geometries, allowing a significant improvement in quality control of such effects. Other advantages will be apparent to one of ordinary skill in the art, given the description that follows, including the figures and claims.

BRIEF DESCRIPTION OF THE DRAWINGS

Like reference numerals denote like elements throughout.

DETAILED DESCRIPTION

Figure 1:
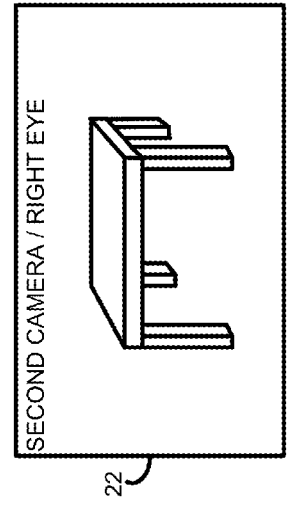
FIGS. 1(A)-1(C) illustrate a set of virtual stereo cameras imaging a structure, as well as a view from each of the respective cameras.
Figure 1:
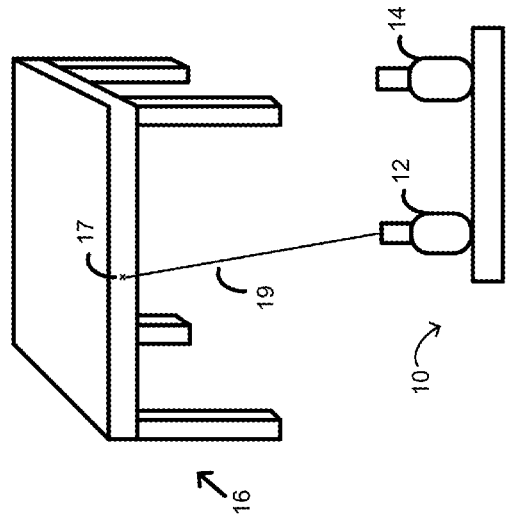
Figure 1:
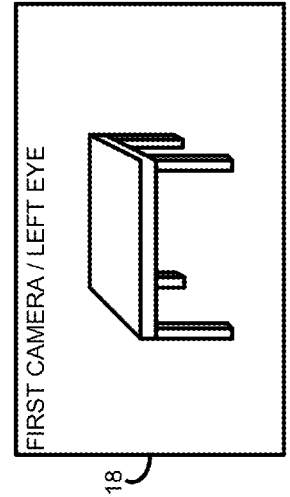

FIG. 1(A) schematically illustrates a system 10 including a set of stereographic cameras 12 and 14 imaging a table 16. A point 17 on the table 16 is illustrated at a distance 19 from the viewing plane of the camera 12. Resulting images 18 and 22 from the respective cameras are illustrated in FIG. 1(B) and FIG. 1(C) (the differences from left eye to right eye have been exaggerated for illustration), respectively. Such illustrate images from native stereographic plates, and the table is termed herein a "feature" or "structure" on the image.

To include CG objects in the scene including such features or structures, processes have been developed such as Match Moving, in which the motion of significant markers on a native stereo plate is tracked through a scene and employed to inform the movement of virtual CG cameras in which a CG object is visualized.

In a non-3-D sequence of images, a CG environment is created that matches the dimensions of structures of what was filmed on the set such that when CG objects are inserted, the same match the features or structures properly. In one system, such may appear as a wireframe overlaid on top of certain structures, e.g., tables, floors, characters, and the like. The wireframe should move in the same way that the camera moves, e.g., as a camera moves to various parts of the scene as well as zooms in or out. In this way, CG objects tied to the wireframe will appear properly relative to the features or structures in the native plates.

Figure 2:
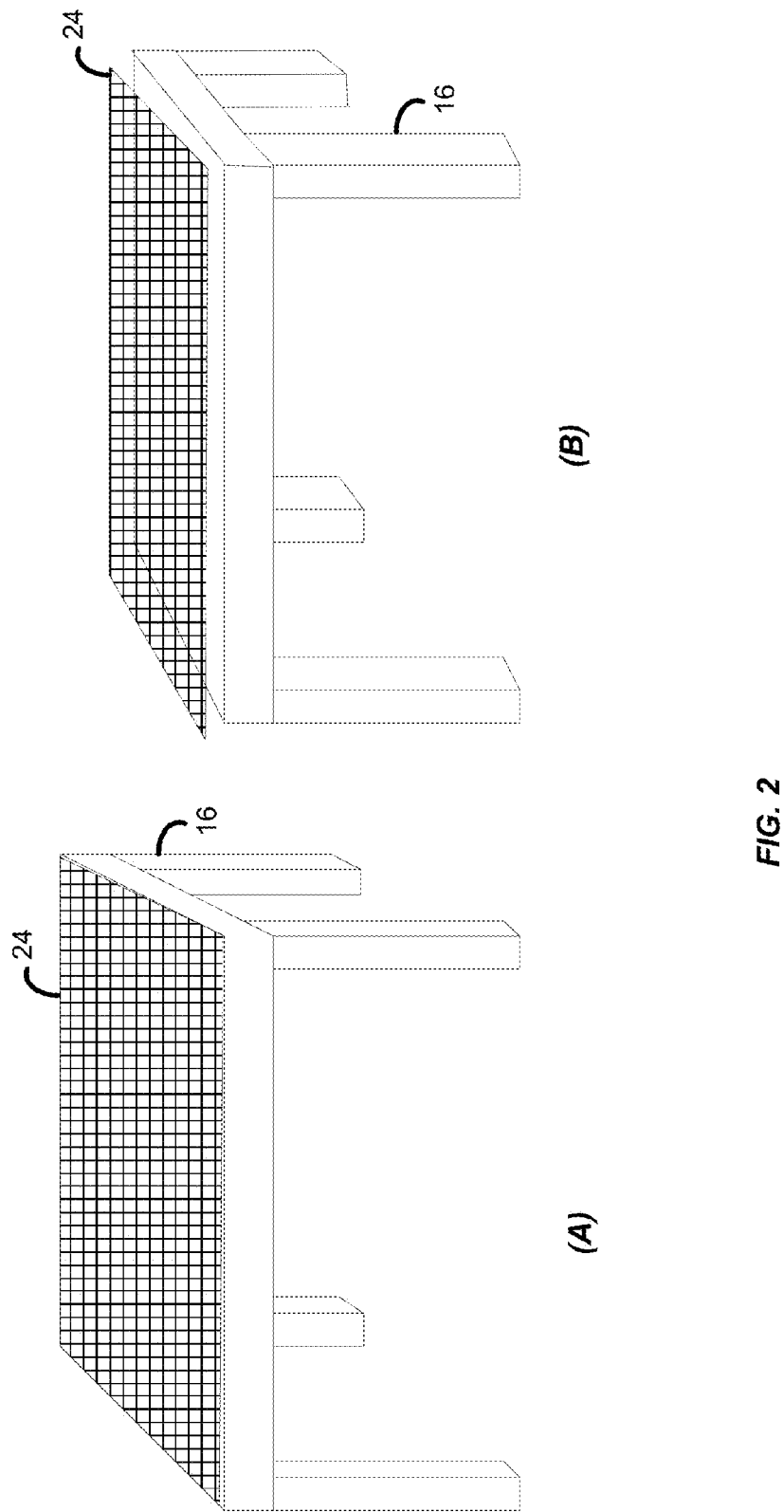
FIGS. 2(A)-2(B) illustrate a schematic view of a structure in a native stereographic plate, i.e., a table, as well as a repeating pattern projected onto the table, from each of two stereographic views.
Figure 3:
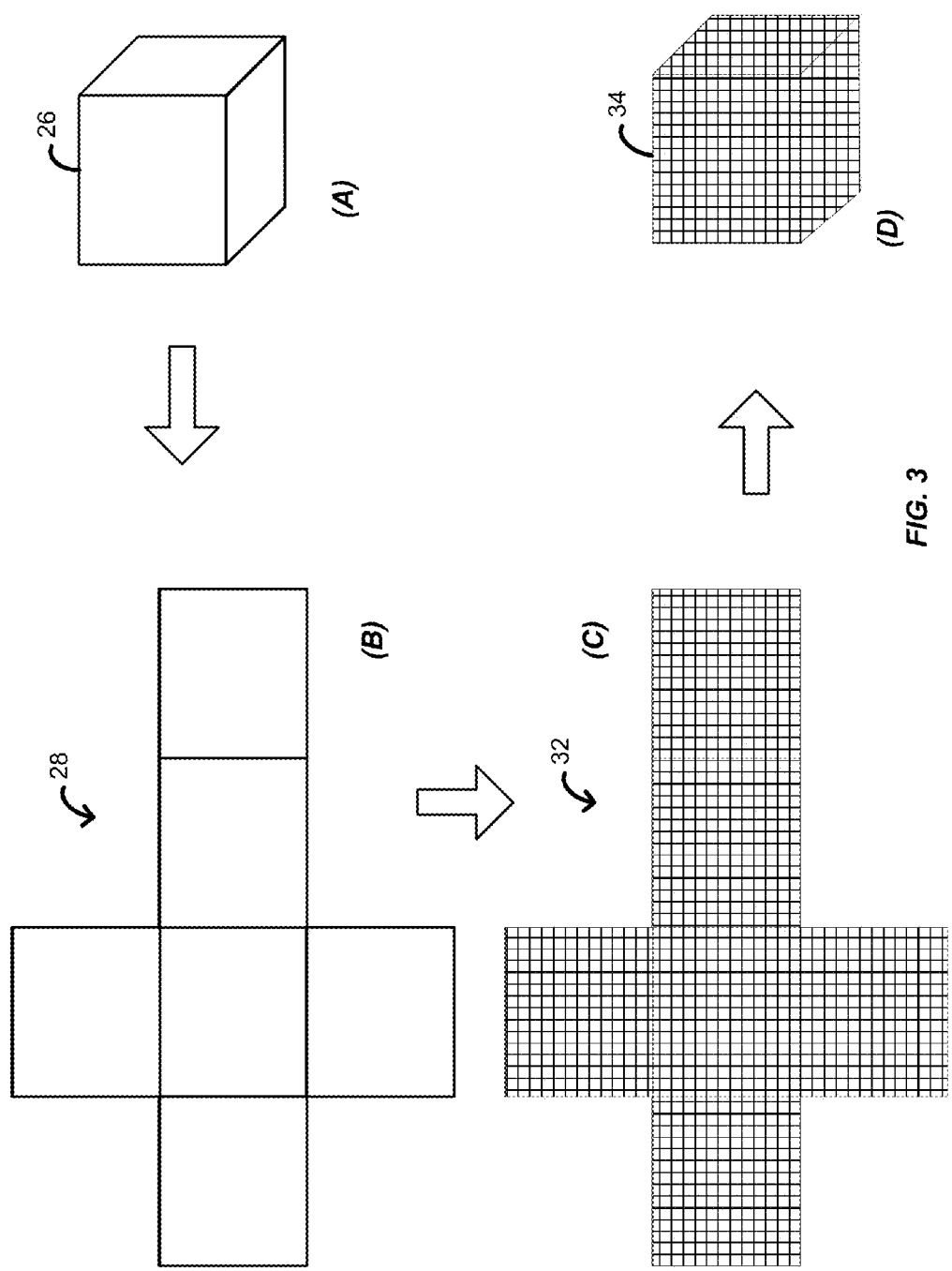
FIG. 3 is a schematic depiction of a technique for UV mapping.

In a 3-D sequence of images, complexities and difficulties may arise because such wireframes are no longer required to match the structures in just two dimensions, but also in a third. Put another way, and considering a stereo set of images from left and right cameras, a wireframe may be seen to match structures well in a view from a left camera but may be mismatched when viewing through the right camera. This situation is illustrated in FIG. 2, in which FIG. 2(A) illustrates a view from a left camera of a table 16 with a repeating pattern 24 overlaid on a CG object representing the surface. The repeating pattern 24 appears to match the top of the table 16 adequately. However, in FIG. 2(B), which illustrates a view from the corresponding right camera of the stereographic pair, the repeating pattern 24 is disposed above the surface of the table 16. In this case, the matching on the left eye is satisfactory but not on the right eye. In other cases, the matching may even appear adequate for both eyes but when the image is viewed in stereo, the patterned object may appear to float above a surface or have other artifacts associated such as vertical offsets that differ between the stereo images and the CG match move renders.

Certain systems and methods according to principles disclosed here provide convenient ways to solve such difficulties, to allow for better quality control of match move processes for stereographic systems. One aspect of addressing such difficulties pertains to visualizing textures on surfaces as well as on other CG objects, e.g., characters. Such textures may be repeating patterns of 2D elements of substantially equal size, so that when seen in a composite with a set of native stereo plates, relative and absolute depths can be easily determined.

A typical way of putting textures on objects is seen in FIGS. 3(A)-3(D). These figures illustrate UV mapping, in which an object such as cube 26 (FIG. 3(A)) is "unwrapped" as is seen in the unwrapped or flattened object 28 of FIG. 3(B). Significant detail about surfaces is provided to the mapping system, and in this way the system lays patches onto the surface, which are then "sewn" together where they meet. The mapping system then creates the texture and applies the texture to the unwrapped object as seen by textures 32 in FIG. 3(C). The object may then be reconstructed for use as seen by textured cube 34 in FIG. 3(D). Such UV mapping is generally a complicated process, although useful for generating textures.

Figure 4:
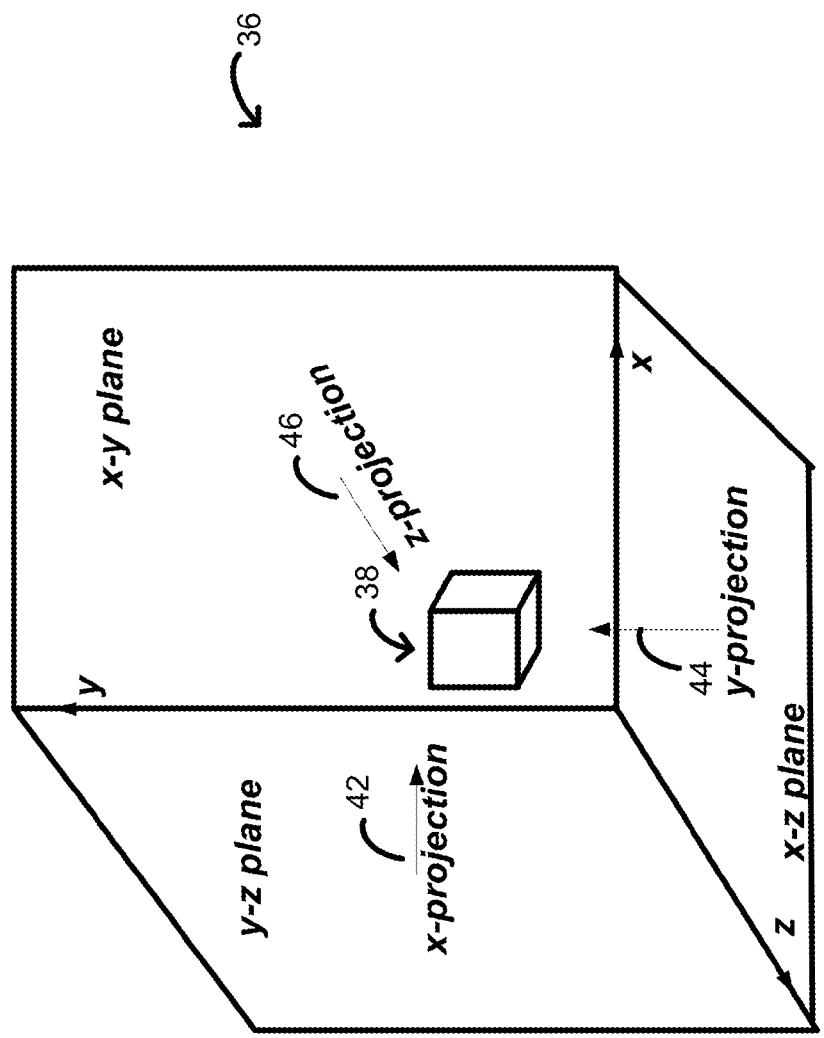
FIG. 4 is a schematic depiction of a technique for tri-planar projection.

A more convenient method of providing textures on objects may be seen in FIG. 4. In the system 36 of FIG. 4, an object 38 is situated within the fixed 3-D space defined by x, y, and z axes. In FIG. 4, "tri-planar projection" is employed, generated from a tri-planar shader, in which a texture is projected from each of the three directions defined by the axes. The figure shows an x-projection 42, a y-projection 44, and a z-projection 46. Textures are projected along the axes, according to which axial direction a polygon on a CG object is primarily facing. In many cases, fronts and backs of CG objects may have similar angles of incidence, and a projection for each may be from the same axis of projection.

Such projections can be performed very quickly, and thus provide a more convenient way to place textures on an object. In the specific case of tri-planar projections, as patterns are projected from the axes, even a moving and curved object will generally have regular textures visible. Such is beneficial, as regularly-sized patterns are generally a prerequisite to the convenient evaluation of whether CG objects are configured in an appropriate fashion with respect to native stereo plates. The evaluation may be automatic or may involve user input. While tri-planar projection may be a particularly convenient way of projecting regular patterns, it will be understood that other ways of projecting patterns of substantially similarly-sized 2D elements may also be employed. However, to tri-planar inures certain benefits, such as patterns of generally even spacing even on curved 3-D surfaces. In contrast, with UV textures, the spacing of patterns on the head of a character may differ from that on the body, and pinching may occur at seams and as between body sections, making evaluation of depth for quality control of match move processes more difficult.

Figure 5:
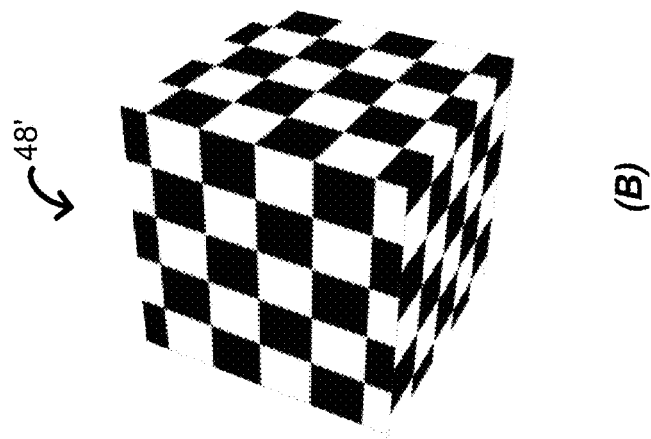
FIGS. 5(A) and 5(B) are depictions of patterns from UV and tri-planar projections of a cube, respectively.
Figure 5:
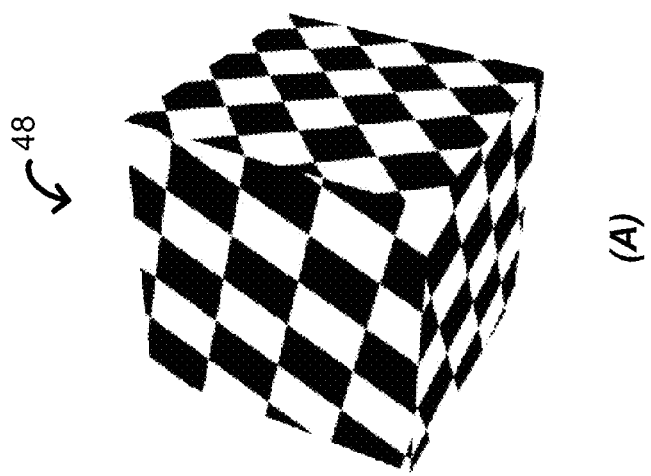

As a particular example, FIG. 5(A) illustrates a cube 48 on which has been projected a regular repeating pattern 48 of 2D elements, in this case squares, using tri-planar projection. Due to the regular repeating pattern, the distance of the cube from a viewing plane, equivalent to a camera plane, can be generally easily seen. FIG. 5(B) illustrates a cube in which a UV projection 48' has been placed. While such projections may be employed, the same are highly inconvenient to implement.

Figure 6:
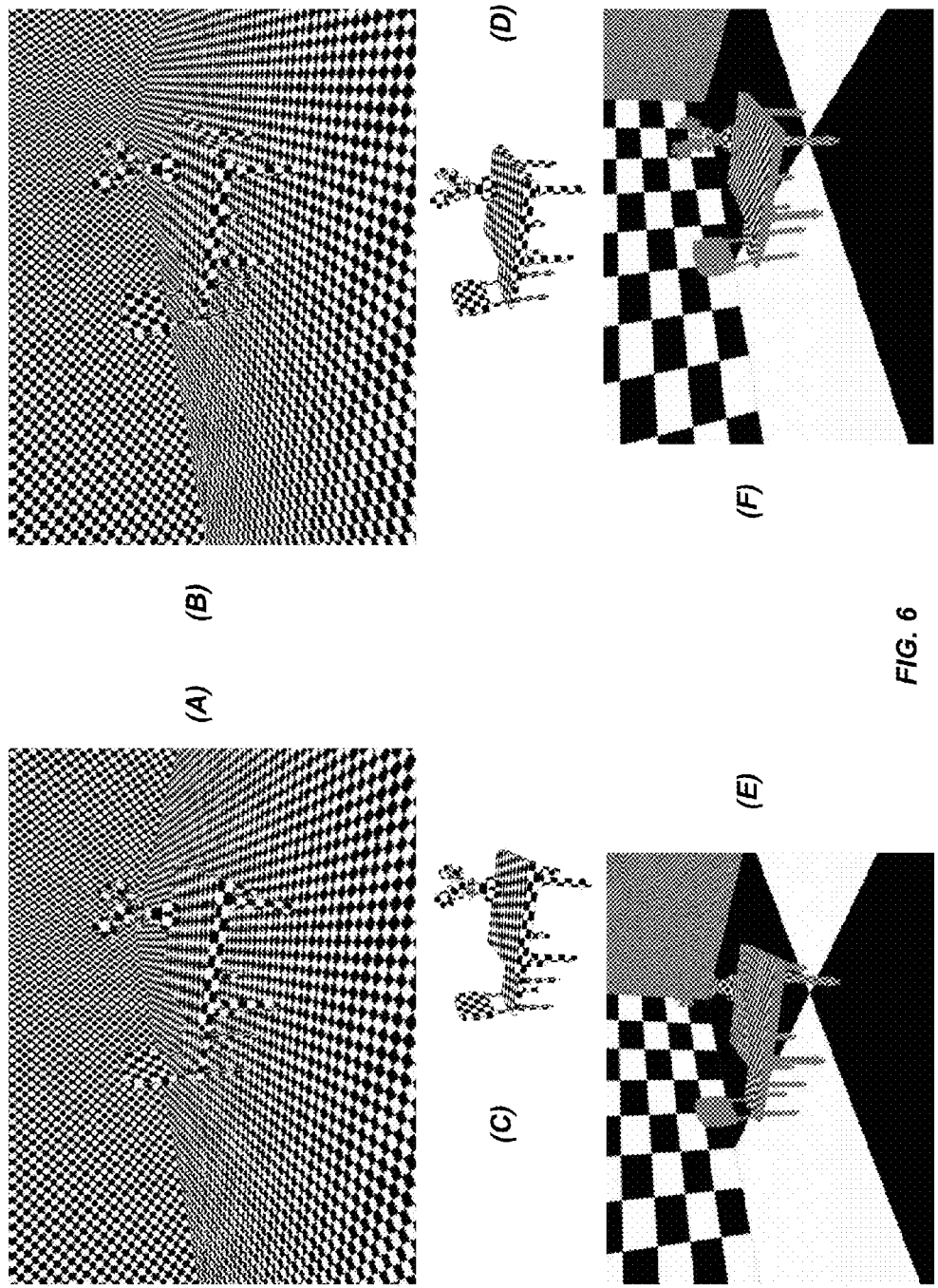
FIG. 6 is a depiction of a resulting pattern from tri-planar projection of a typical scene in a movie.

FIG. 6 illustrates a more complicated situation, such as may be used in a scene of a movie, illustrating tri-planar projection on a number of objects associated with (in some way) features or structures on the native stereo plate. For example, the tri-planar projection may be on a CG object representing a top of a table, where the CG object is intended to act as a base for a character that may be standing on the top of the table. Certain implementations of the system and method may then be employed to ensure that rotomation of the character standing on the table may be accomplished with the appearance of correct depth of the character (in the render of the character on a user interface) vis-a-vis the structure of the table in the native stereo plate.

In particular, FIGS. 6(A) and 6(B) illustrate left and right stereo views, respectively, of the scene, and FIGS. 6(C) and 6(D) illustrate respective left and right detail views of a chair, table, and flower vase within the scene. For comparison, FIGS. 6(E) and 6(F) are provided to illustrate left and right views, respectively, of a UV layout of the same scene. In addition to being significantly more difficult to implement, some of the UVs may be seen to be so tight that the texture appears as gray instead of a pattern of black and white.

As noted above, artifacts may be seen where a projected pattern on an object does not properly match a surface or other feature in a native stereo plate, or where projected patterns appear to be floating when viewed in stereo, even if on individual plates the pattern appears to match. In certain implementations of systems and methods according to principles disclosed here, a solution may be to change the geometry, e.g., move the CG object such that when viewed in 3-D it is coincident with the desired feature or structure in the native stereo plate, or in some cases, to adjust a parameter of the virtual cameras. Other solutions may also be employed as appropriate. Without such a solution, placement of the CG object on the native stereo plate, based on or referenced to the pattern location, may generally result in an improper appearance of the CG object, e.g., one that floats above a surface or is otherwise out of position.

As noted above, in some cases it may be appropriate to adjust parameters of virtual cameras, as the animator may be relatively sure of the position of the CG data, if the same was received from survey data or the like. Such camera parameters may include the position of the stereo cameras, their intraocular distance, their orientation or rotation, or the like.

Where the geometry is changed, the position of the CG object is adjusted so that its appearance is optimized for both views and so that, in stereo, its depth is appropriate for the scene and for a feature, if any, that the CG object is intended to simulate or otherwise correspond, reference, or be related to.

Figure 7:
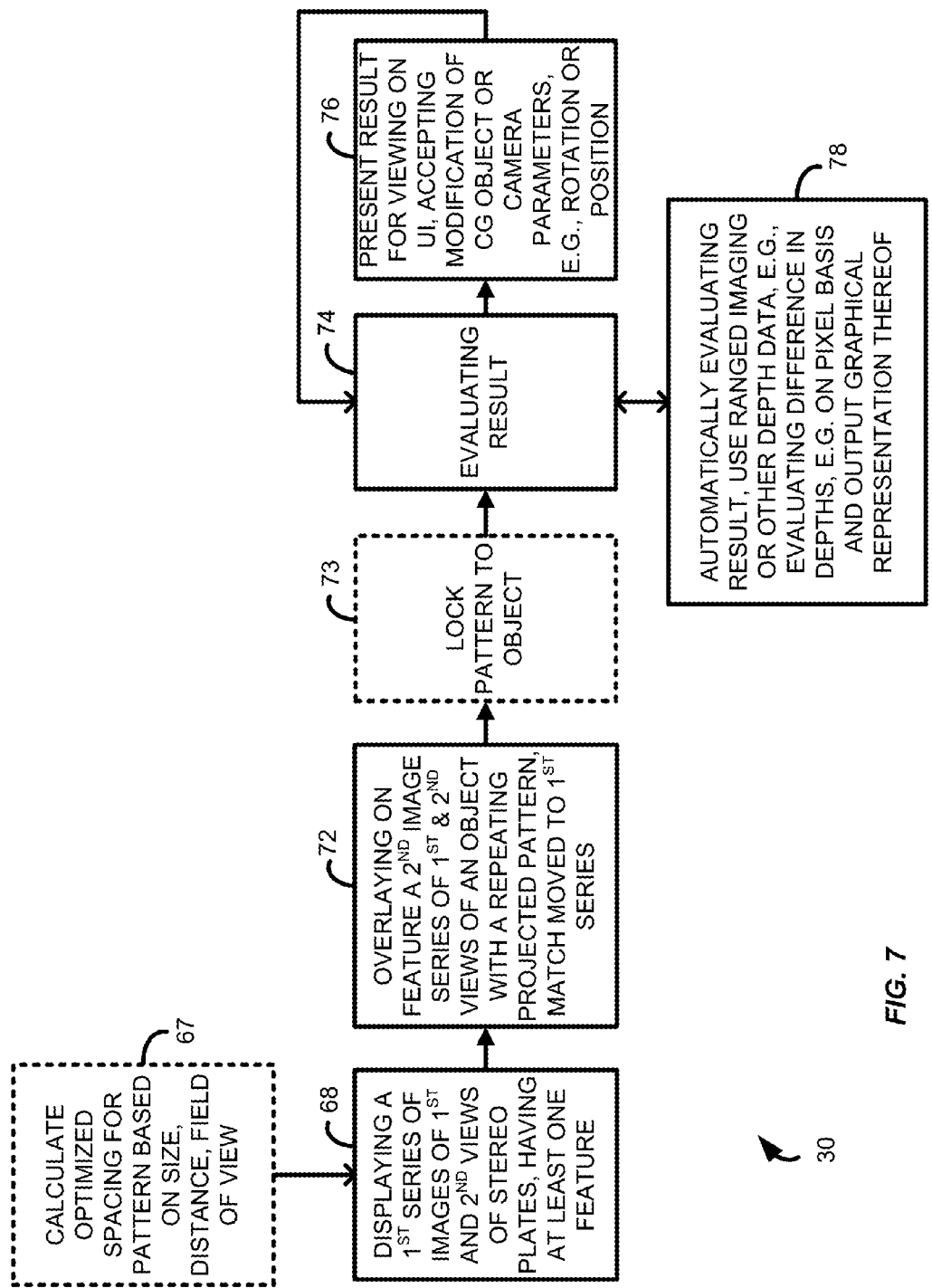
FIG. 7 is a flowchart of a first method for quality control of a match move process according to the principles disclosed here.

One method according to an implementation of the principles disclosed here is shown in a flowchart 30 of FIG. 7. In this flowchart, a first step, which is optional, is to automatically calculate an ideal spacing for the regular pattern based on parameters such as a distance between a viewing or camera plane and a CG object, the camera field of view, or the like (step 67). Such may automatically calculate, for example, that a faraway character or object requires a larger spacing of an applied regular pattern, e.g., forming larger 2D elements or other repeating patterns, so that the same can be seen and evaluated by the animator at the camera or viewing plane. Such capability negates the need to render to determine if an applied pattern was too small or large.

A next step may be the displaying of a first series of images of first and second views of stereo plates (step 68). In other words, the native stereo plates may be displayed or otherwise loaded into a memory for later display or evaluation, the native stereo plates generally defining at least one feature, such as a floor, a surface of a structure, a character, or the like. A second series of images may be projected or overlaid on the first series of images (step 72), the second series of images generally including a repeating pattern being projected on a CG object, where the CG object generally corresponds to, references, or represents one or more features in the native stereo plates.

The pattern may be locked onto a surface of the object by defining the surface as a texture reference object (step 73). In particular, it is noted that procedural projection shaders, such as the tri-planar shader mentioned above, project images from virtual cameras. But the cameras do not move, so moving objects such as characters or vehicles appear to "swim" through the projected patterns. So for a given CG object surface, a repeating pattern may be locked onto the CG object surface by creating a texture reference object for the surface. Such projects the texture on a first frame, and then essentially locks the texture onto the object in subsequent frames. As objects do not subsequently swim through projected patterns, objects and their movements may be more easily visualized as the patterns move with the objects. Texture reference objects may be applied to any or all animated moving characters or objects. While not required in every implementation of the system and method, use of texture reference objects generally makes evaluation and judging of match move processes easier, more convenient, and more intuitive.

A result may then be evaluated (step 74), such as by seeing how well the CG objects, with the repeating pattern thereon, move relative to features or structures in the native stereo plates, particularly those with which they are intended to represent. For example, evaluations may be made regarding how well the CG objects move with movements of the stereo cameras, whether the CG objects appear to float in front of features or structures photographed by the stereo cameras when viewed in 3-D, or the like.

This evaluation may be in a number of ways. In a way involving user input, the result may be presented for viewing on a user interface (step 76). Employing the user interface, a user may modify a CG object or a camera parameter, or the like, and determine if such modifications improve the result.

The evaluation may also be performed automatically (step 78). In general, for automatic determinations, a point of a feature in the native stereo plate may be corresponded to a point on the patterned CG object, and the evaluation may include detecting a first distance from a viewing plane of the feature in the stereo plate, and detecting a second distance from a viewing plane of the corresponding point on or in the patterned CG object, and providing an output indicating a difference between the first and second distances. The evaluating may be performed for a number of points on the pattern and the output may graphically indicate difference values for each point or pixel in the plurality.

In a specific example, for rotomated characters, a first pass of rotomation may be performed, and disparity differences may be determined between a left and right eye. The depth of the CG object may then be determined, and if the depth of the corresponding feature in the native plate may be determined, then an error image may be output, where numerical differences between the depths are output as colors. If a difference value below a certain predetermined threshold is output as a black pixel, and above the threshold as a white pixel, the CG object or camera parameters may be adjusted so as to maximize the number of black pixels. In some cases, the depth of a feature in the native plate may be determined by ranged imaging cameras, which can automatically determine and store depth values along with pixel color values.

Figure 8:
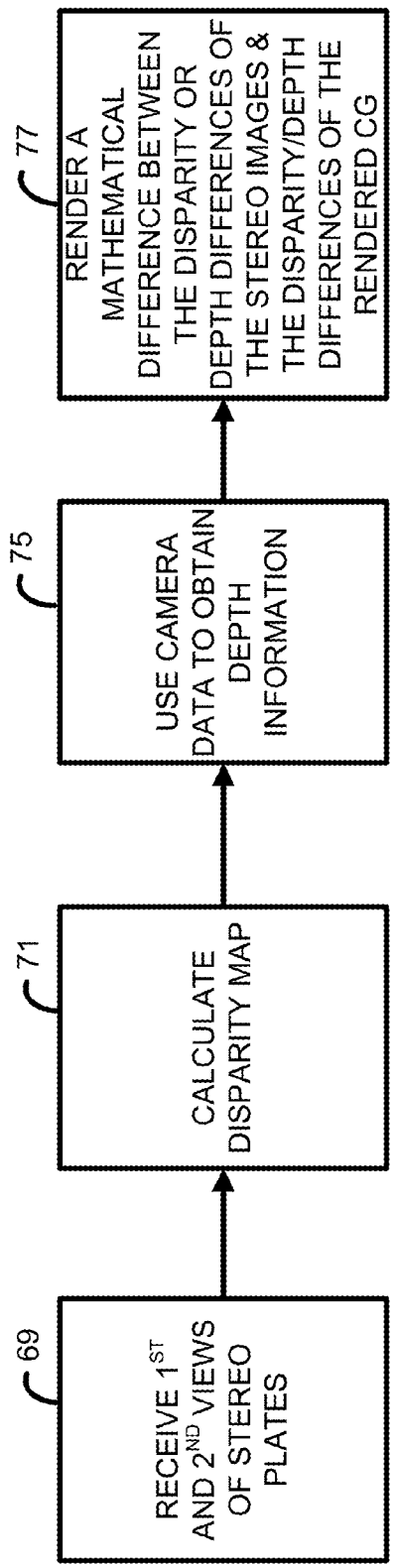
FIG. 8 is a flowchart of another method for quality control of a match move process according to the principles disclosed here.

FIG. 8 is a flowchart 40 of another exemplary method in which a disparity map is employed to calculate depths. In particular, right and left stereo plates may be received (step 69) and processed by one of several commercial packages which generate a disparity map (step 71), or a map indicating the difference between the two views, primarily along the horizontal or x-axis. Camera data, e.g., the intraocular distance, may then be employed to convert the disparity map at various points into pixel depths at the respective points (step 75). These calculated depths may then be compared to rendered depths from the CG match move geometries in a method similar to those described above (step 77), e.g., by a difference map indicating the differences at various points or the like.

Figure 9:
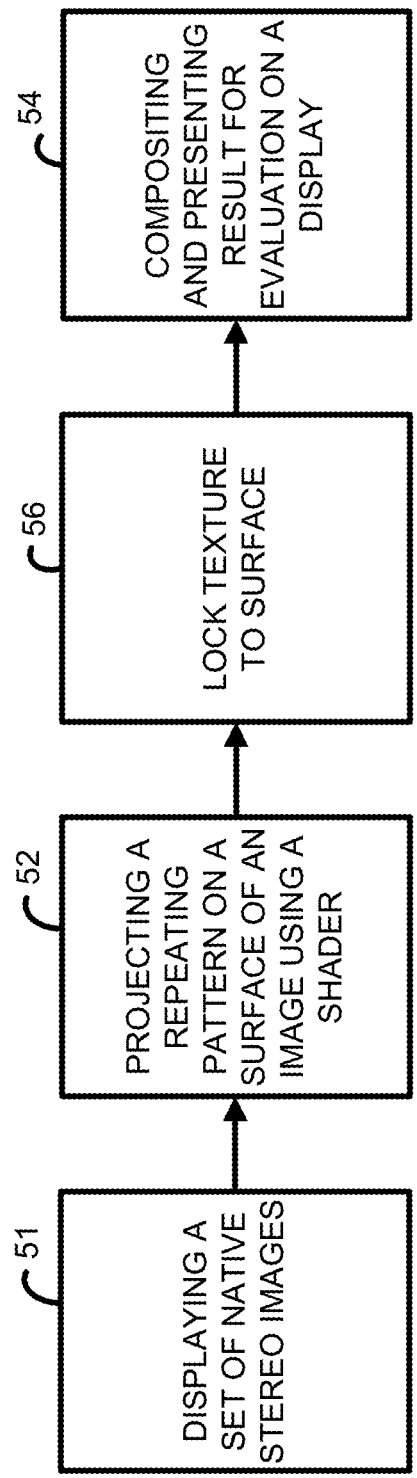
FIG. 9 is a flowchart of another method for quality control of a match move process according to the principles disclosed here.

The flowchart 20 of FIG. 9 shows another method according to principles disclosed here. A first step, which is optional, is to display or otherwise load into memory a set of native stereo images (step 51). A next step is projecting a repeating pattern on a surface of an image using a shader (step 52). The image may be, e.g., a CG object, and the shader may be a tri-planar shader or other shader that projects a regular pattern. A next step, which is also optional, is to lock the texture onto the surface (step 56). In this way, depths of moving objects may be more conveniently visualized. A next step is to render the CG and composite the results of steps 51 and 52 and present the composite for evaluation on a display (step 54). Generally an animator will use such results to modify camera parameters or CG geometry to achieve a desired artistic effect.

Figure 10:
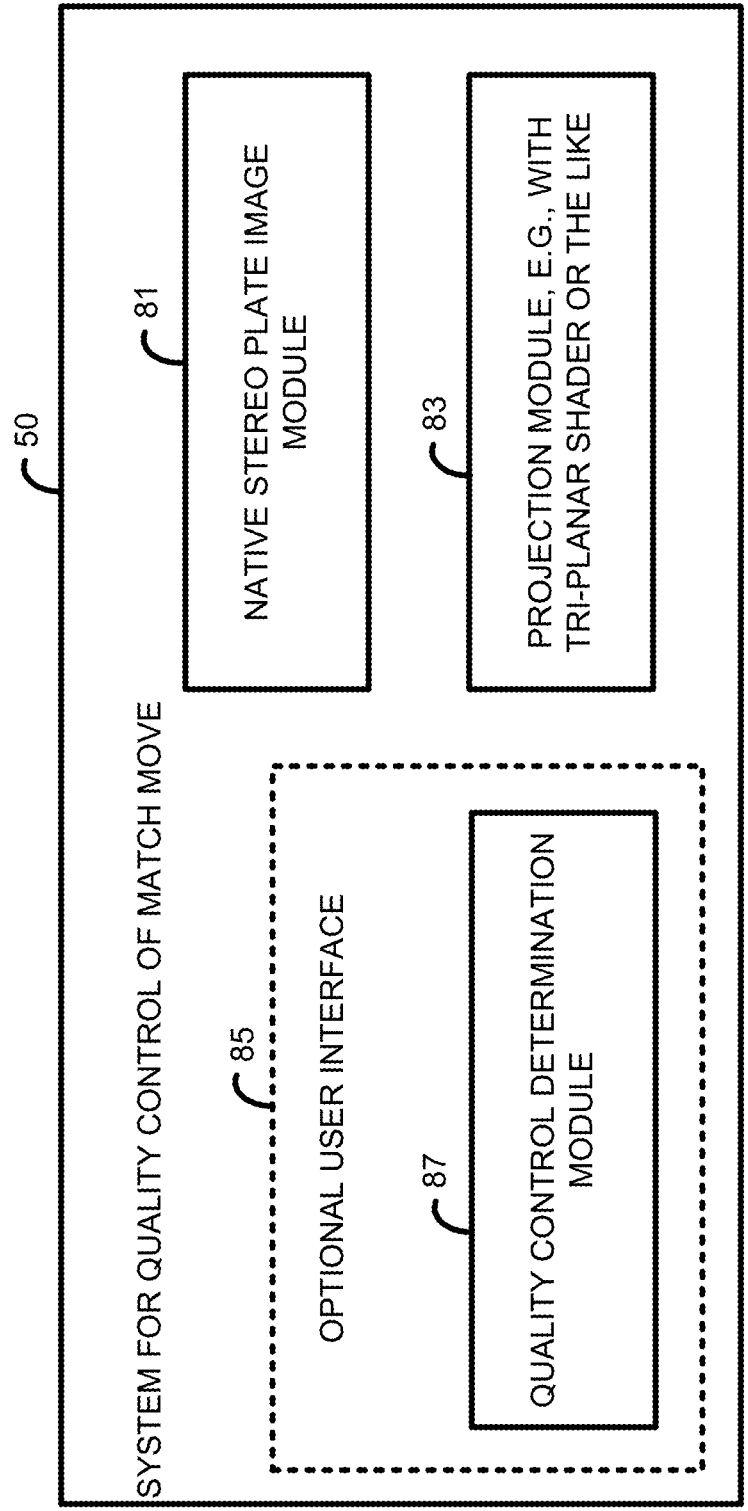
FIG. 10 illustrates an exemplary computing environment in which systems according to principles disclosed here may be situated, and through which methods may be performed.

FIG. 10 illustrates an exemplary system 54 for quality control of match move processes. The system 50 may include a native stereo plate image module 81 which displays a first series of images pertaining to first and second stereographic views of native stereo plates, the plates having at least one feature thereon. The system 50 may further include a projection module 83 for projecting a second series of images pertaining to respective first and second stereographic views, the second series match moved to the first series and including a repeating pattern projected on a CG object, the CG object bearing a relation to aspects of the native stereo plate and in many cases to the feature. The projection module may project or overlay the repeating pattern on a surface of the CG object within the second series of images, and the repeating pattern may be locked onto the CG object by creating a texture reference object for the surface.

An optional user interface 85 may be employed, which includes a quality control determination module 87. The module 87 may determine quantitatively how the second series moves with the first series as the respective series are simultaneously sequentially displayed. In essence, the module 87 determines how well the projected images match up with desired corresponding features on the stereographic plates, e.g., whether the projections move with the native stereo cameras, whether the projections appear to undesirably float above features in the native plates, or the like.

What has been described are systems and methods for using procedural textures applied to one or more surfaces in a match move or rotomation scene to be better evaluate depth. The systems and methods improve and make more convenient quality control for match move effects. The systems and methods employ projection of a pattern, e.g., a checkerboard pattern using tri-planar shading, to allow convenient detection and determination of depths of CG objects versus those from native stereo plates. The systems and methods may further employ texture reference objects to make more convenient the visualization of moving objects within the match move scene.

In an alternative implementation, ranged imaging cameras may be employed to obtain depth information. In a first step, a first series of images of first and second stereographic views of a scene, i.e., native stereo plates, are captured, the images having at least one feature or structure. The images are captured using cameras with ranged imaging, such that a depth value is obtained at least for the feature. A next step is to project or overlay on, at least the feature, a second series of images pertaining to respective first and second stereographic views, the second series having a CG object with the projected repeated pattern thereon. Generally the projection is on all CG objects in the second series of images, and generally at least one CG object bears some relation to the feature or structure in the native plates. The second series may be match moved to the first series. The object may have a point thereon corresponding to a point on the native plates, e.g., on the feature. As the distances of features in the native stereo plate are known from the first step, the second series may be placed such that a distance of the point in the second series from a viewing plane is equal to the distance (also from the viewing plane) of the corresponding point on the feature in the native stereo plate.

One implementation includes one or more programmable processors and corresponding computer system components to store and execute computer instructions, such as to provide the projection of a checkerboard pattern and to present a view of the images for evaluations of depth. One such computing environment is disclosed below.

Figure 11:
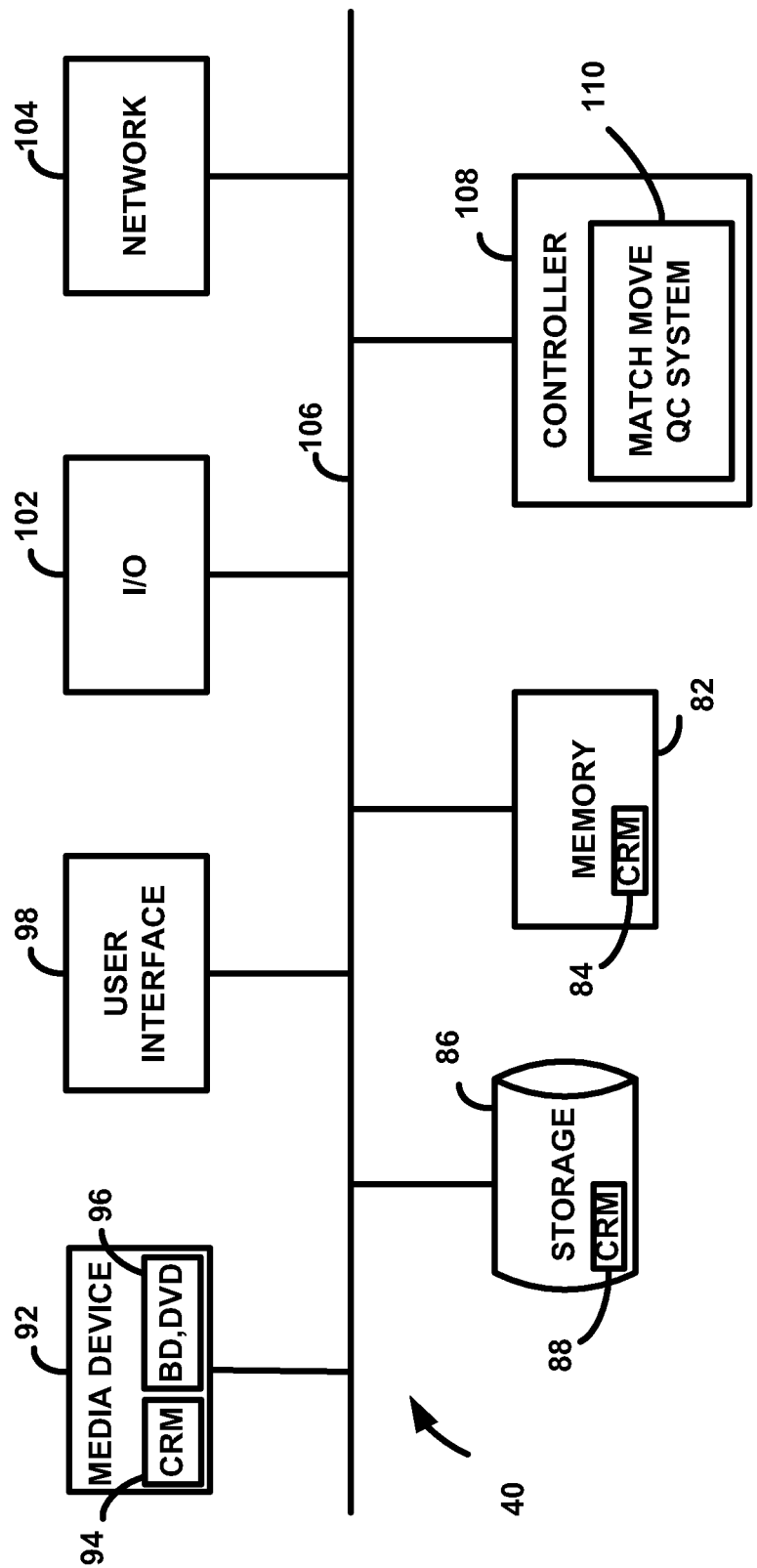
FIG. 11 illustrates another exemplary computing environment in which systems according to principles disclosed here may be situated, and through which methods may be performed.

Referring to FIG. 11, a representation of an exemplary computing environment 100 for an animation workstation is illustrated.

The computing environment 40 includes a controller 108, a memory 82, storage 86, a media device 92, a user interface 98, an input/output (I/O) interface 102, and a network interface 104. The components are interconnected by a common bus 106. Alternatively, different connection configurations can be used, such as a star pattern with the controller at the center.

The controller 108 includes a programmable processor and controls the operation of the match move quality control system 110. The controller 108 loads instructions from the memory 82 or an embedded controller memory (not shown) and executes these instructions to control the system.

Memory 82, which may include non-transitory computer-readable memory 84, stores data temporarily for use by the other components of the system. In one implementation, the memory 82 is implemented as DRAM. In other implementations, the memory 84 also includes long-term or permanent memory, such as flash memory and/or ROM.

Storage 86, which may include non-transitory computer-readable memory 88, stores data temporarily or long-term for use by other components of the system, such as for storing data or instructions. In one implementation, the storage 86 is a hard disc drive or a solid state drive.

The media device 92, which may include non-transitory computer-readable memory 94, receives removable media and reads and/or writes data to the inserted media. In one implementation, the media device 92 is an optical disc drive or disc burner, e.g., a writable Blu-ray® disc drive 96.

The user interface 98 includes components for accepting user input, e.g., the user indication of match move results or other aspects discussed above, and presenting a display to the user. In one implementation, the user interface 98 includes a keyboard, a mouse, audio speakers, and a display. The controller 108 uses input from the user to adjust the operation of the computing environment.

The I/O interface 102 includes one or more I/O ports to connect to corresponding I/O devices, such as external storage or supplemental devices, e.g., a printer or a PDA. In one implementation, the ports of the I/O interface 102 include ports such as: USB ports, PCMCIA ports, serial ports, and/or parallel ports. In another implementation, the I/O interface 102 includes a wireless interface for wireless communication with external devices. These I/O interfaces may be employed to connect to one or more content playback devices.

The network interface 104 allows connections with the local network and includes a wired and/or wireless network connection, such as an RJ-45 or Ethernet connection or "Wi-Fi" interface (802.11). Numerous other types of network connections will be understood to be possible, including WiMax, 3G or 4G, 802.15 protocols, 802.16 protocols, satellite, Bluetooth®, or the like.

The system may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

Various illustrative implementations of the present invention have been described. However, one of ordinary skill in the art will recognize that additional implementations are also possible and are within the scope of the present invention. For example, the disclosed systems and methods can be applied to images from movies, television, video games, etc. Other ways of generating the checkerboard pattern may also be employed, including UV shading and the like, although it is believed that tri-planar shading may result in a particularly convenient comparison for stereo depth determination and quality control. While checkerboard patterns have been disclosed, any regularly repeating pattern may be employed, including those constituted of 2D elements, e.g., substantially-regularly-sized 2D elements. The projection of the regularly repeating pattern may be on all objects in the scene or on a subset of objects. While current technology generally requires that a user such as an animator modify parameters in the 3-D animation software to adjust distances per the methods above, it will be understood that it is envisioned that advances in 3-D animation software will allow for the automatic modification of such distance relationships. Accordingly, the present invention is not limited to only those implementations described above.

The invention claimed is:

1. A method of performing quality control during a match move process, comprising:
   a. displaying a first series of images pertaining to first and second stereographic views of native stereo plates, the native stereo plates having at least one feature thereon;
   b. projecting on a computer-generated object a second series of images pertaining to respective first and second stereographic views, the second series match moved to the first series and including a repeating pattern;
   c. corresponding a point of the feature with a point on the patterned object; and
   d. evaluating a depth of the second series relative to a feature on the native stereo plates, wherein the evaluating includes detecting a first distance from a viewing plane of the feature in the native stereo plate, and detecting a second distance from the viewing plane of the corresponding point on the patterned object, and providing an output indicating a difference between the first and second distances.

2. The method of claim 1, wherein the repeating pattern is a checkerboard pattern.

3. The method of claim 1, further comprising:
   calculating an optimized spacing for the repeating pattern based on a size of the computer-generated object or a distance of the computer-generated object from a viewing plane; and
   projecting on the computer-generated object the second series of images with the optimized spacing.

4. The method of claim 1, wherein the repeating pattern is projected by a tri-planar shader.

5. The method of claim 1, wherein the repeating pattern is projected on a surface of the computer-generated object within the second series of images, and further comprising locking the repeating pattern onto the computer-generated object by creating a texture reference object for the surface.

6. The method of claim 1, wherein the evaluating is performed automatically.

7. The method of claim 1, wherein the evaluating is performed for a plurality of points on the patterned object and corresponding points on the feature, and wherein the providing an output is performed graphically by providing an output indicating difference values for each point in the plurality of points.

8. The method of claim 1, wherein the evaluating is performed with user input.

9. The method of claim 8, further comprising providing a user interface for displaying the first and second series of images and for accepting user input on resolving unsatisfactory match moves.

10. The method of claim 9, wherein the accepting user input includes accepting user input altering a position or orientation of the patterned object.

11. The method of claim 9, wherein the accepting user input includes accepting user input altering a camera parameter.

12. The method of claim 11, wherein the camera parameter includes a degree of rotation or a position.

13. A non-transitory computer-readable medium, comprising instructions for causing a computing environment to perform the method of claim 1.

14. A method of assisting quality control during a match move process, comprising:
   a. capturing a first series of images pertaining to first and second stereographic views of native stereo plates;
   b. calculating a disparity map from the first and second stereographic views;
   c. from the disparity map and camera data including intraocular distance calculating depths for a plurality of points in the first and second stereographic views;
   d. comparing the calculated depths to rendered depths from a computer-generated match move geometry to compare the locations of points in the geometry to corresponding points in the first and second stereographic views; and
   e. outputting a result of the comparing step.

* * * * *